Jan. 28, 1936.  W. OWEN  2,028,916
APPARATUS FOR LAMINATING GLASS
Filed March 9, 1934  3 Sheets-Sheet 1
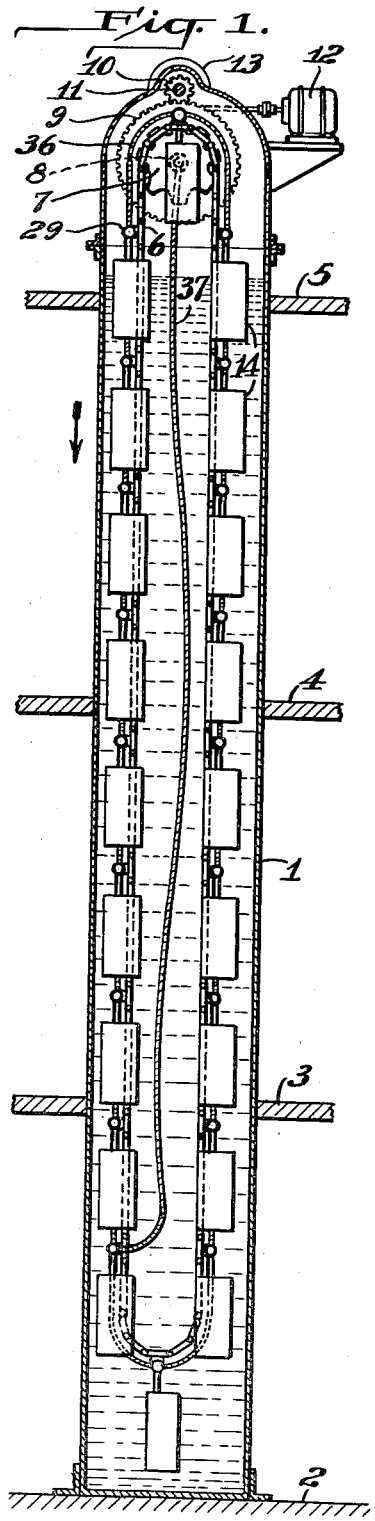
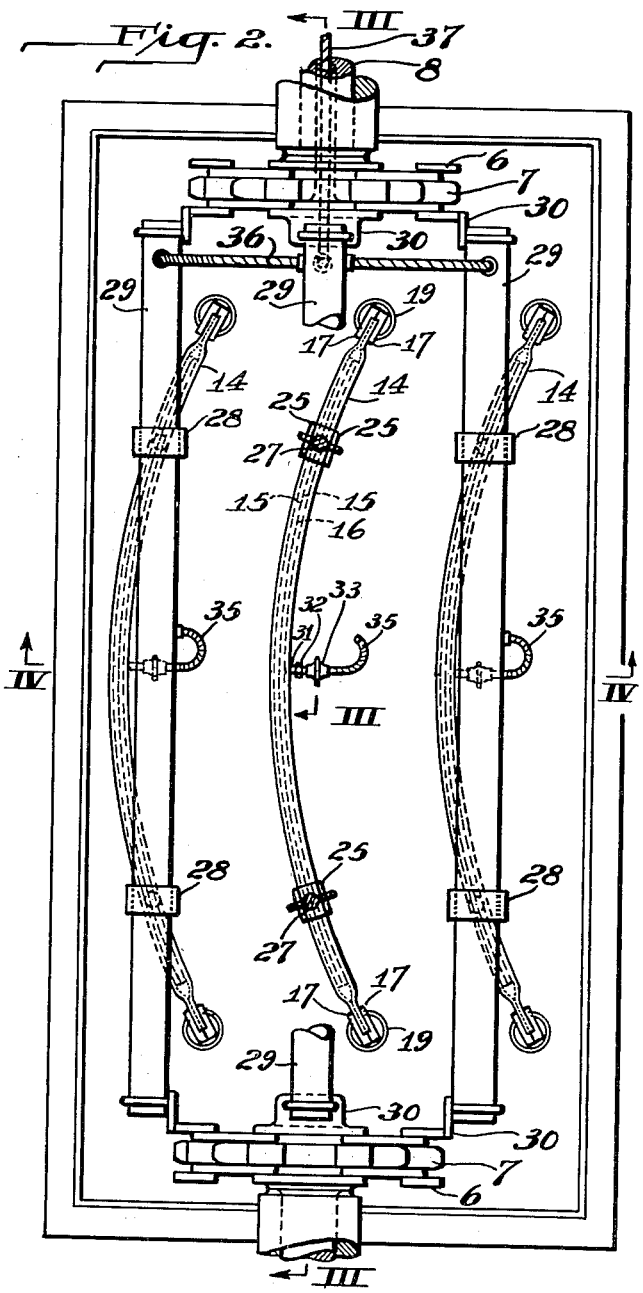
INVENTOR Jan. 28, 1936.  W. OWEN  2,028,916
APPARATUS FOR LAMINATING GLASS
Filed March 9, 1934  3 Sheets-Sheet 2
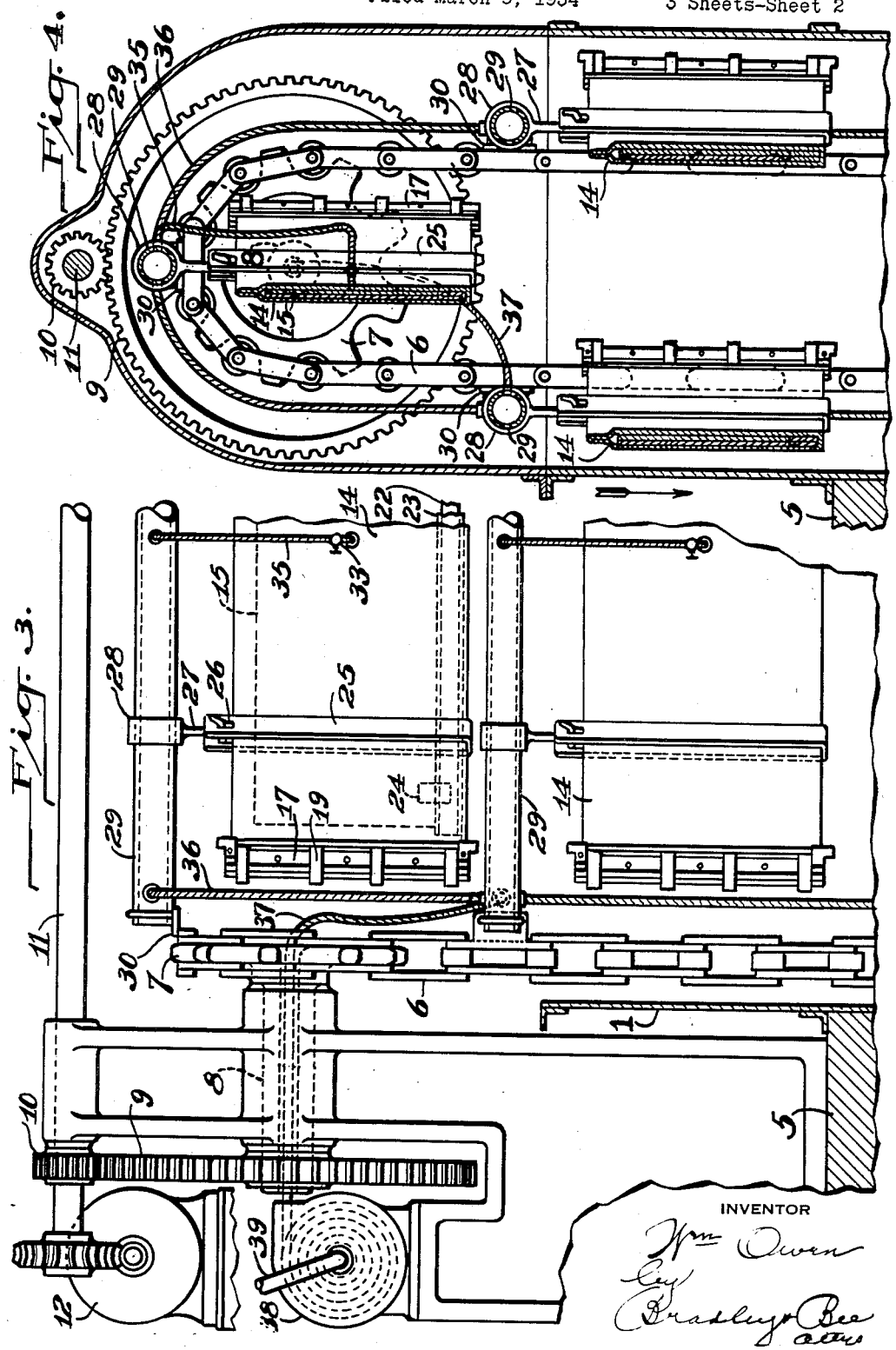

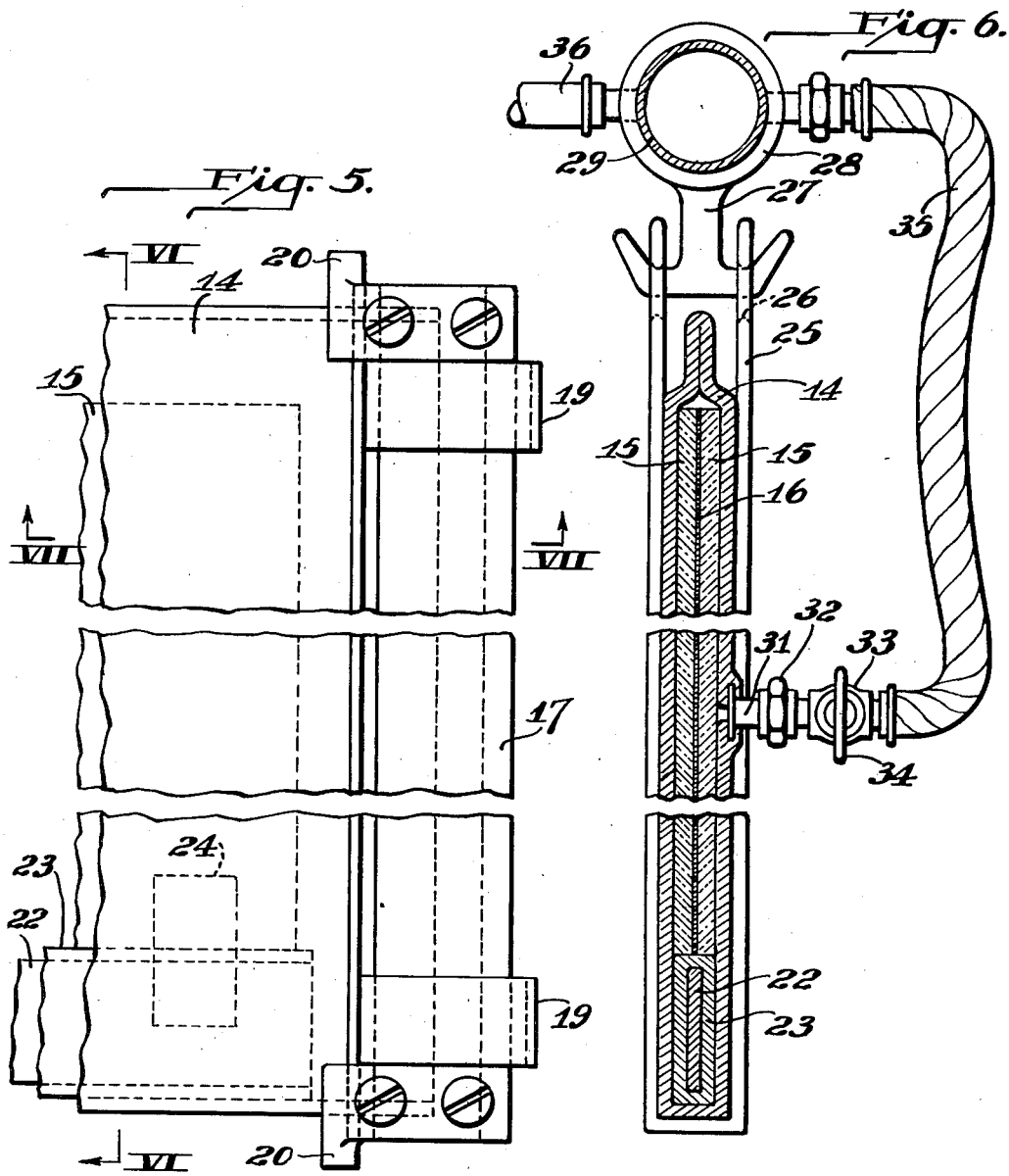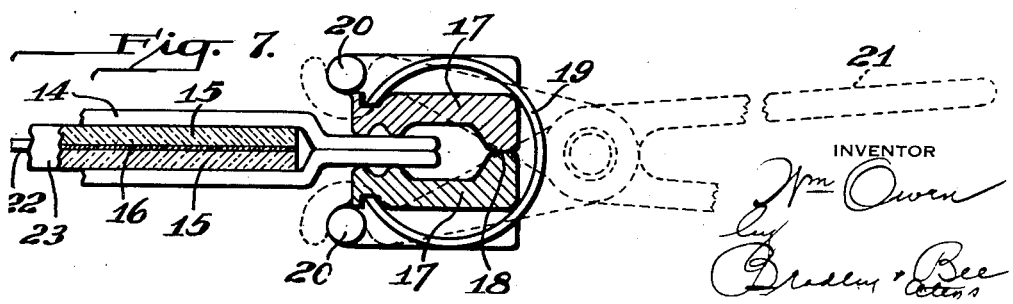

Patented Jan. 28, 1936

2,028,916

UNITED STATES PATENT OFFICE 2,028,916

APPARATUS FOR LAMINATING GLASS

William Owen, Pittsburgh, Pa., assignor to Pittsburgh Plate Glass Company, a corporation of Pennsylvania Application March 9, 1934, Serial No. 714,778

6 Claims. (Cl. 49—81)

The invention relates to apparatus for making laminated or safety glass which ordinarily comprises two sheets of glass cemented to the opposite sides of a sheet of reinforcing material, such as cellulose nitrate plastic (celluloid) or cellulose acetate plastic. The apparatus comprises a development of the apparatus of the patent of J. H. Sherts No. 1,905,189, and is designed particularly for laminating curved sheets preliminary to a final pressing operation in which the laminated plates are placed in an autoclave and exposed directly to the pressing fluid which is applied at relatively high pressure and temperature, as set forth in the Sherts and Hamill Patent No. 1,781,084. The invention has for its principal objects, the provision of an improved apparatus adapted to handle sheets of different curvature; the provision of apparatus of the character specified having improved means for supporting the sheets to be laminated and sealing them off from contact with the pressing liquid, and one employing containers or bags for the sets of sheets which are relatively cheap and which permit the insertion and removal of the sets of sheets with a minimum expenditure of time and effort. One embodiment of the invention is illustrated in the accompanying drawings, wherein:

Figure 1 is a vertical, somewhat diagrammatic view through the complete apparatus. Fig. 2 is a plan view of the apparatus with certain of the parts broken away. Fig. 3 is a section on the line III—III of Fig. 2. Fig. 4 is a section on the line IV—IV of Fig. 2. Figs. 5 and 6 are enlarged detail views of the container or bag, Fig. 5 being a partial side elevation, and Fig. 6 a section on the line VI—VI of Fig. 5. And Fig. 7 is a section on the line VII—VII of Fig. 5.

Referring to the drawings, 1 is a container or tank of considerable depth supported upon the floor 2 and extending through the floors 3, 4 and 5. This tank is filled with a pressing liquid preferably of high boiling solvent, such as diethylene glycol, and this liquid is suitably heated to a temperature somewhat above 200 deg. F. by means which are not shown. Extending down into this tank is an endless conveyor made up of a pair of chains 6, 6 passing around sprockets 7 mounted above the upper end of the tank. The sprockets 7 are carried by a pair of shafts 8, 8, one of which is hollow and is shown in Fig. 3. The shafts 8 have gears 9 keyed thereto, which gears are driven by means of pinions 10 carried by a transverse shaft 11. The shaft 11 is driven from the electric motor 12 through the intermediary of a worm carried by the shaft of the motor and a worm wheel in the casing 13, which is keyed to the shaft 11. Secured in series along the length of the conveyor chains are a series of rubber bags or containers 14 which carry the sets of sheets to be laminated.

In operation, the bags are loaded with the sets of sheets and hung upon the conveyor which is driven slowly so as to carry the bags vertically down through the bath in the tank 1, and then upwardly through the bath, the conveyor preferably moving in the direction indicated by the arrow in Fig. 1, so that the loaded bags are attached to the conveyor by an operator standing upon the floor 5 to the left of the tank. The bags are removed from the conveyor by an operator standing on the floor 5 at the right of the tank, who removes the set of sheets which are now cemented together, forming the laminated plate. The temperature and pressure to which the bags are exposed in their passage through the tank, are sufficient to cement the sheets rigidly together and seal the joints at the edges of the plates. This operation constitutes the preliminary pressing of the plates, and as heretofore explained, these plates are then preferably given another pressing in accordance with the procedure set forth in the Sherts and Hamill patent, which pressing is known as the final pressing. In this final pressing, the plates are placed in an autoclave and subjected to a pressure of about 150 lbs. per square inch and to a temperature of about 240 degrees F., the temperature and pressure being varied within a considerable range depending upon the character of the product.

The containers or bags are preferably flat and are open at both ends, which construction greatly facilitates the operation of inserting the sets of sheets to be laminated and in removing the sets of sheets after the laminating operation is completed. This type of bag is also much less expensive than one which is open only at one end and closed at the other end.

Figs. 5, 6 and 7 illustrate the bag or container after it has been closed and clamped with the set of sheets therein. The set of sheets as illustrated comprises the pair of glass sheets 15, 15 with the interposed sheet of cellulose plastic 16, the inner faces of the glass sheets being provided with a suitable cement, such as gelatin or the like, which is made effective to cement the sheets together upon the application of heat and pressure. The clamping means at each end of the bag preferably comprises a pair of plates 17, 17 having pivotal engagement at 18 and being pressed yieldingly towards each other by means of the springs 19, 19, 19. The closing pressure as thus exerted by the plates 17, 17 is sufficient to seal the edge of the bag against the passage of liquid during the pressing operation. The plates 17, 17 are provided at each end with a lug 20 and in opening the clamp, the pliers 21, as indicated in Fig. 7, are preferably employed, one pair of pliers being applied at each end of the plate 17, 17. It is thus possible to use powerful springs to press the plates towards each other in order to give the necessary clamping action, since the use of the pliers or unclamping tools permits the ready opening of the clamp despite the strong springs which are employed to close it. In order to facilitate the insertion and removal of the set of plates, and in order to protect the lower edge of the bag from cutting action by the edges of the glass sheets when they are inserted into the bag and removed therefrom, a stiffening member is applied in the lower edge of the bag, such stiffening member comprising the sheet metal plate 22 having the rubber sheath 23. The plate 22 is bent to the approximate curvature of the sheets which are placed in the bag and this curvature may be readily changed from time to time when sheets having different curvature are laminated in the apparatus.

In loading the bag, it may be suspended in a vertical position, and the edge of the set of sheets supported upon the plate 22 as the sheets are pushed into the bag, this expedient rendering the loading of the bag easier and protecting the lower edge thereof from the cutting action of the edges of the glass sheets. A similar advantage also is present in removing the sheets from the bag, the plate 22 being pulled out with the set of sheets. In order to hold the plate 22 and the set of sheets in alignment during the loading and unloading operation, they are preferably attached together by means of a series of paper stickers 24, as illustrated in Fig. 5, such stickers being applied on each side in order to give greater strength.

In order to support the bags and their contents in a vertical plane upon the conveyor, each bag is preferably provided with a pair of straps 25 of thin sheet metal which are provided with slots 26 at their free ends. These straps are applied around the bags, as indicated in Figs. 3 and 6, and are hooked over the bag hangers 27 which are provided with collars 28 mounted upon the pipes 29. The pipes 29 are attached at intervals to the conveyor chains 6, 6 by means of the brackets 30. The bags are thus suspended pivotally on the conveyor, and during the pressing operation, occupy the vertical positions indicated in Fig. 1. The mounting of the bags in this vertical position with respect to the tank, permits the use of a tank of minimum width, which would not be the case if the bags were supported transversely of the tank.

As is well known in the art, it is necessary to exhaust the air from the rubber container or bag carrying the set of sheets to be laminated during the pressing operation, and in order to accomplish this function, the apparatus is provided with means whereby exhausting means is connected to each of the bags during the period in which it is passing through the tank 1. As indicated in Fig. 6, one side of each of the bags is provided with a nipple 31, on which is swivelled a union 32. Connected to this union is a valve member 33 provided with a cock having a suitable handle 34. This fixture is connected to a flexible pipe 35 whose other end is connected to the pipe 29, which acts as an exhaust header. The pipes 29 are connected in series by means of the hose sections 36. The system, including the pipes 29 and hose sections 36, is exhausted by means of a pipe connection 37 (Figs. 3 and 4), which is connected to one of the pipes 29 and extends through the hollow shaft 8 into the reel casing 38. This casing contains a spring reel on which the hose 37 is wound, the end of such hose being connected to the hollow shaft of the reel, and such hollow shaft is connected by means of a hose 39 with a suitable exhausting apparatus, not shown. This arrangement permits the hose 37 to be unwound from the reel as the pipe 29, to which the hose is connected, descends into the tank, and on the reverse movement of the pipe 29, the spring reel winds up the pipe again, bringing it back to the position indicated in Fig. 3, as the pipe 29 approaches the top of the tank.

It will be understood that the means for exhausting the air from the bags constitutes no part of the present invention, and that any suitable means might be substituted for applying vacuum to the bags during the pressing operation. As a matter of fact, each of the bags may be exhausted before it is placed on the conveyor, the tightness of the bag being depended upon, in that case, to maintain the vacuum during the pressing operation. This is the method commonly practiced in pressing laminated glass in rubber bags in an autoclave. There is some advantage, however, in applying a continuous exhaust to the bags during the pressing operation, as in that case, the product will not be injured, even though there is some leakage in one of the bags. When the bag is removed from the conveyor after the pressing operation is completed, the valve 33 is closed to prevent any loss of vacuum in the system. In carrying out the operation, it is also possible to load and unload the bags without removing them from the conveyor, the movement of the carrier at such time being stopped to permit the convenient carrying out of this operation.

What I claim is:

1. In apparatus for making laminated glass, a vertical tank containing a body of heated liquid, an endless conveyor movable vertically into the bath and then upward and out of the bath, a plurality of carriers for the sets of sheets to be laminated, each comprising a flat rubber container closed at its upper and lower sides and open at one end pivotally and removably connected to the carrier so that the container and the sheets therein lie in a vertical plane during their movement to and from and through the liquid, and clamping means for closing the open ends of the containers.

2. In apparatus for making laminated glass, a vertical tank containing a body of heated liquid, an endless conveyor movable vertically into the bath and then upward and out of the bath, a plurality of carriers for the sets of sheets to be laminated connected in series along the length of the conveyor and each comprising a flat rubber container or bag closed at its upper and lower sides and open at both ends and suspended removably on the conveyor so that the container and the sheets therein lie in a vertical plane during their movement to and from and through the liquid, and clamping means for closing the open ends of the containers.

3. In apparatus for making laminated glass, a vertical tank containing a body of heated liquid, an endless conveyor movable vertically into the bath and then upward and out of the bath, a plurality of carriers for the sets of sheets to be laminated, each comprising a flat rubber container open at one end pivotally connected to the carrier so that the container and the sheets therein lie in a vertical plane during their movement through the liquid, a plate of metal in the lower edge of each container having the approximate curvature of the sets of sheets, and clamping means for closing the open ends of the containers.

4. In apparatus for making laminated glass, a vertical tank containing a body of heated liquid, an endless conveyor movable vertically into the bath and then upward and out of the bath, a plurality of carriers for the sets of sheets to be laminated, each comprising a flat rubber container open at one end pivotally connected to the carrier so that the container and the sheets therein lie in a vertical plane during their movement through the liquid, a plate of metal sheathed with rubber fitting removably in the lower edge of each container having the approximate curvature of the sets of sheets, and clamping means for closing the open end of the container.

5. In apparatus for making laminated glass, a vertical tank containing a body of heated liquid, an endless conveyor movable vertically into the bath and then upward and out of the bath, a plurality of carriers for the sets of sheets to be laminated, connected in series along the length of the conveyor and each comprising a flat rubber container or bag open at both ends and suspended on the conveyor so that the container and the sheets therein lie in a vertical plane during their movement through the liquid, a plate of metal having a flexible cover fitting removably in the lower edge of each container having the approximate curvature of the sets of sheets, and clamping means for closing the open ends of the containers.

6. In apparatus for making laminated glass, a vertical tank containing a body of heated liquid, an endless conveyor movable vertically into the bath and then upward and out of the bath, a plurality of carriers for the sets of sheets to be laminated connected in series along the length of the conveyor and each comprising a flat rubber container or bag open at both ends and suspended on the conveyor so that the container and the sheets therein lie in a vertical plane during their movement to and from and through the liquid, a plate of metal having a flexible cover fitting removably in the lower edge of each container having the approximate curvature of the sets of sheets, and clamping means for closing the open ends of the containers, the connection between the containers or bags and the conveyor being a releasable one so that the containers may be removed from the conveyor for loading and unloading.

WILLIAM OWEN.